(12) United States Patent
Lee et al.

(10) Patent No.: US 9,994,225 B1
(45) Date of Patent: Jun. 12, 2018

(54) METHOD AND APPARATUS FOR CONTROLLING A SYNCHRONOUS ENGAGEMENT CLUTCH IN A MULTI-MODE POWERTRAIN SYSTEM

(71) Applicant: GM GLOBAL TECHNOLOGY OPERATIONS LLC, Detroit, MI (US)

(72) Inventors: Chunhao J. Lee, Troy, MI (US); Farzad Samie, Franklin, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days. days.

(21) Appl. No.: 15/479,372

(22) Filed: Apr. 5, 2017

(51) Int. Cl.
| | |
|---|---|
| *B60W 10/02* | (2006.01) |
| *B60W 10/06* | (2006.01) |
| *B60W 30/19* | (2012.01) |
| *F16D 48/06* | (2006.01) |
| *F16D 41/16* | (2006.01) |

(52) U.S. Cl.
CPC ............ *B60W 30/19* (2013.01); *B60W 10/02* (2013.01); *B60W 10/06* (2013.01); *F16D 48/06* (2013.01); *B60W 2510/0241* (2013.01); *B60W 2510/0275* (2013.01); *B60W 2510/0283* (2013.01); *B60W 2710/021* (2013.01); *B60W 2710/0666* (2013.01); *F16D 41/16* (2013.01); *F16D 2500/106* (2013.01); *F16D 2500/10412* (2013.01); *F16D 2500/10456* (2013.01); *F16D 2500/30406* (2013.01); *F16D 2500/30412* (2013.01); *F16D 2500/30415* (2013.01); *F16D 2500/30426* (2013.01); *F16D 2500/70426* (2013.01)

(58) Field of Classification Search
CPC ...... B60W 10/02; B60W 10/06; B60W 30/19; B60W 2510/0241; B60W 2510/0275; B60W 2510/0283; B60W 2710/021; B60W 2710/0666; F16D 48/06
See application file for complete search history.

(56) References Cited

U.S. PATENT DOCUMENTS

| | | | | |
|---|---|---|---|---|
| 7,757,802 B2* | 7/2010 | Cimatti | ................... | B60K 17/35 180/247 |
| 2010/0063694 A1* | 3/2010 | Lee | ........................ | B60W 10/02 701/54 |
| 2011/0136607 A1* | 6/2011 | Samie | .................... | B60K 6/445 475/2 |

* cited by examiner

*Primary Examiner* — Edwin A Young
(74) *Attorney, Agent, or Firm* — Quinn IP Law

(57) ABSTRACT

A powertrain system includes a geartrain configured to transfer mechanical power between an internal combustion engine, torque machines and a driveline by activation of a synchronous engagement clutch. A method includes commanding activation of the synchronous engagement clutch, including commanding operations of the engine and the first and second torque machines to control members of the clutch, including monitoring speeds thereof. A magnitude of clutch slip is determined. A zero-slip feedback control routine is executed when the clutch slip approaches a zero-slip state, wherein the zero-slip feedback control routine is operative to control the engine and the first and second torque machines to control the rotational speeds of the opposed first and second members to achieve zero clutch slip. The synchronous engagement clutch is activated when the clutch slip is less than a threshold level associated with the zero-slip state.

15 Claims, 2 Drawing Sheets

METHOD AND APPARATUS FOR CONTROLLING A SYNCHRONOUS ENGAGEMENT CLUTCH IN A MULTI-MODE POWERTRAIN SYSTEM

Synchronous engagement clutches minimize parasitic load when deactivated.

SUMMARY

A powertrain system is described and includes a geartrain that is configured to operate in a transmission state to transfer mechanical power between an internal combustion engine, torque machines and a driveline by activation of a synchronous engagement clutch. The synchronous engagement clutch is composed of opposed first and second members that are disposed to rotate in concert when the synchronous engagement clutch is activated, and are disposed to rotate independently from each other when the synchronous engagement clutch is deactivated. A method for operating the powertrain system includes commanding activation of the synchronous engagement clutch, including commanding operations of the engine and the first and second torque machines to control rotational speeds of the opposed first and second members of the synchronous engagement clutch, including monitoring the rotational speeds of the opposed first and second members. A magnitude of clutch slip is determined based upon the rotational speeds of the opposed first and second members. A zero-slip feedback control routine is executed when the clutch slip approaches a zero-slip state, wherein the zero-slip feedback control routine is operative to control the engine and the first and second torque machines to control the rotational speeds of the opposed first and second members to achieve zero clutch slip. The synchronous engagement clutch is activated when the clutch slip is less than a threshold level associated with the zero-slip state.

An aspect of the disclosure includes the geartrain configured to operate in one of a plurality of transmission states, and wherein the activation of the synchronous engagement clutch is associated with operation of the geartrain in one of the transmission states.

Another aspect of the disclosure includes commanding operations of the engine and the first and second torque machines to control rotational speeds of the opposed first and second members of the synchronous engagement clutch by controlling torque outputs of the engine and the first and second torque machines responsive to an operator request for output torque.

Another aspect of the disclosure includes commanding deactivation of the synchronous engagement clutch.

Another aspect of the disclosure includes commanding operations of the engine and the first and second torque machines to control torque outputs, and monitoring the rotational speeds of the opposed first and second members, determining a magnitude of clutch torque based upon the torque outputs, executing a zero-torque feedback control routine when the clutch torque approaches a zero-torque condition, wherein the zero-torque feedback control routine is operative to control torque output from the first and second torque machines to achieve and maintain zero torque, and deactivating the synchronous engagement clutch when the clutch torque is zero.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which:

FIGS. 3 and 4 schematically illustrate cross-sectional views of an exemplary synchronous engagement clutch that is configured as low-friction or non-friction clutch, wherein FIG. 3 illustrates operation of the clutch in a one-way state and FIG. 4 illustrates operation of the clutch in a locked state, in accordance with the disclosure.

The appended drawings are not necessarily drawn to scale, and present a somewhat simplified representation of various preferred features of the present concepts that are disclosed herein.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the drawings are in simplified form and are not to precise scale. For purposes of convenience and clarity, directional terms may be used with respect to the drawings. These and similar directional terms are not to be construed to limit the scope of the disclosure. Furthermore, the disclosure, as illustrated and described herein, may be practiced in the absence of an element that is not specifically disclosed herein.

Figure 1:
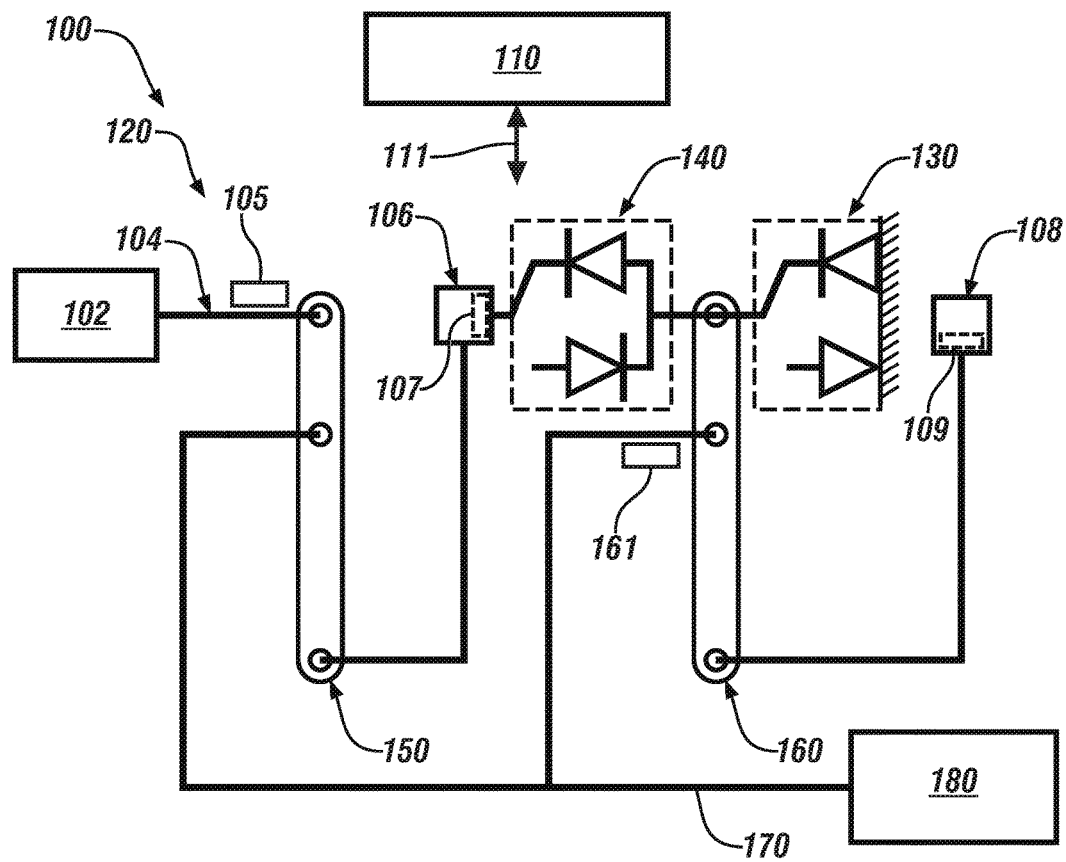
FIG. 1 schematically illustrates a multi-mode powertrain system that includes an internal combustion engine, first and second non-combustion torque machines and a geartrain that are controlled to transfer mechanical power to an output shaft that is coupled to a driveline, in accordance with the disclosure.

Referring to the drawings, wherein like reference numerals correspond to like or similar components throughout the several Figures, FIG. 1, consistent with embodiments disclosed herein, schematically illustrates a multi-mode powertrain system 100 that may be disposed in a vehicle to provide tractive power to a driveline 180 that is coupled to one or more vehicle wheels. The vehicle may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure.

The powertrain system 100 described herein is preferably configured as a multi-mode powertrain system that includes an internal combustion engine (engine) 102, a first non-combustion torque machine 106, a second non-combustion torque machine 108 and a geartrain 120 that are controlled in a coordinated manner to transfer mechanical power to an output shaft 170 that may couple to the driveline 180. The engine 102, the first and second non-combustion torque machines 106, 108 and elements of the geartrain 120 are monitored by and/or operatively controlled by a controller 110. The controller 110 commands such operation in response to an operator request for output torque and other factors, such as a state-of-charge (SOC) of a DC power source that supplies power to the first and second non-combustion torque machines 106, 108. The geartrain 120 is preferably operative in a plurality of transmission states by selective activation of one or more clutches, including as shown clutch C1 130 and clutch C2 140, wherein the clutches are synchronous engagement clutches. As employed herein, the term "synchronous engagement clutch" refers to a type of clutch that rotatably couples opposed elements or members, wherein the coupling occurs when the rotational speeds of the elements are synchronized and the clutch is carrying torque, with some minimal allowable deviation in the rotational speeds of the synchronizing elements. Synchronous engagement clutches are preferably configured as low-friction or non-friction clutches, and include, by way of non-limiting example, a selectable one-way clutch (SOWC), a binary clutch, a dog clutch, etc. The concepts described herein are not limited to the configuration of the powertrain system 100 that is described with reference to FIG. 1, and may instead be applied towards powertrain systems that employ synchronous engagement clutches to effect operation in one or a plurality of transmission states. Other elements, such as the DC power source, a fuel tank, bearings, etc. are not shown.

The engine 102 may be a suitable internal combustion engine capable of converting liquid fuel to mechanical power by combusting the fuel, and is rotatably coupled to the geartrain 120 via an input member 104. The first and second non-combustion torque machines 106, 108 are described herein as electric motor/generator machines. When the first and second torque machines 106, 108 are configured as electric motor/generator machines, they may include multi-phase electric machines that are electrically connected via respective power inverters and associated controllers to a DC power source. Alternatively, another non-combustion torque machine, such as a pneumatically-powered device or a hydraulically-powered device may be employed. By way of definition, a non-combustion torque machine is a device capable of generating torque by converting a potential energy source to kinetic energy without combustion of the potential energy. Non-limiting examples of the potential energy source may include electric energy, pneumatic energy and hydraulic energy. Pneumatically-powered devices and hydraulically-powered devices are understood and not described in detail herein.

The geartrain 120 includes a first planetary gear 150, a second planetary gear 160 and synchronous engagement clutches in the form of clutch C1 130 and clutch C2 140. The geartrain 120 is operative to transfer torque between the engine 102, the first and second torque machines 106, 108 and output shaft 170 that is coupled to the driveline 180 by selective activation of clutch C1 130 and/or clutch C2 140. Clutch C1 130 is selectively controllable to connect an element of the second planetary gear set 160 to a transmission ground when activated. Clutch C2 140 is selectively controllable to connect an element of the second planetary gear set 160 to the first torque machine 106 when activated. The geartrain 120 is preferably operative in a plurality of transmission states including a fixed-gear state (FG) and electrically-variable states (M1, M2) in a forward direction and a reverse direction by selective activation of clutch C1 130 and/or clutch C2 140.

Rotational speed of the input member 104 is preferably monitored by a speed sensor 105. Rotational speeds of the first and second torque machines 106, 108 are monitored by speed sensors 107, 109, respectively. Rotational speed of the output shaft 170 is preferably monitored by a speed sensor 161. The speed sensors 105, 107, 109 and 161 may be a suitable position/speed monitoring device, e.g., a Hall-effect sensor. Alternatively, the speed sensors 107 and 109 may include resolvers that are associated with operation of the respective first and second torque machines 106, 108. The speed sensors 105, 107, 109 and 161 communicate with the controller 110. The terms "rotational speed" and "speed" are used interchangeably throughout this disclosure.

The controller 110 is in communication with the engine 102, the first and second torque machines 106, 108, and the first and second synchronous engagement clutches C1 130, C2 140 of the geartrain 120 to control operation thereof.

Table 1 illustrates transmission states and states for the first and second clutches C1 130 and C2 140 for the exemplary powertrain system of FIG. 1.

TABLE 1

| Transmission State | C1 | C2 |
|---|---|---|
| M1 (Rev) | R/Lock | R (FW)/Neutral |
| M1 (Fwd) | F/Lock | R (FW)/Neutral |
| M1 (Regen) | R/Lock | R (FW)/Neutral |
| Fixed Gear | F/Lock | F/Lock |
| M2 | F (FW)/Neutral | F/Lock |
| M2 (Regen) | F (FW)/Neutral | Lock |

The transmission states of M1 and M2 indicate a low speed range and high speed range, respectively, of electrically-variable states, and can include, as indicated either a forward direction of operation (Fwd) or a reverse direction of operation (Rev). The transmission states of M1 and M2 can include operation in an electric power consumption mode, or in an electric power regeneration mode (Regen). The electric power regeneration mode may be commanded under vehicle and powertrain operating conditions when kinetic energy associated with vehicle momentum (such as under braking or coasting conditions) can be captured and converted to potential energy via one of the first and second torque machines 106, 108.

Figure 2:
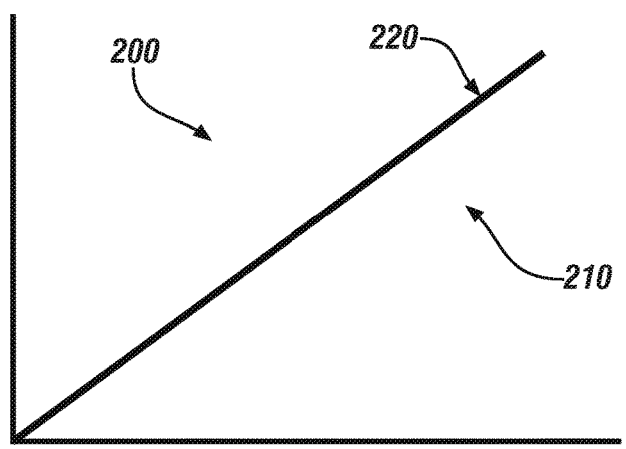
FIG. 2 graphically depicts speeds associated with exemplary transmission states for the exemplary powertrain of FIG. 1, in accordance with the disclosure.

FIG. 2 graphically depicts speeds associated with exemplary transmission states for the exemplary powertrain 100 of FIG. 1, in accordance with the present disclosure. The horizontal axis describes an output speed, for example, the speed of output shaft 170 of FIG. 1. The vertical axis describes an input speed, for example, the speed of input member 104 of FIG. 1. A ratio of the output speed over the input speed provides a gear ratio for the powertrain 100. Line 220 depicts a fixed gear ratio, such that an output speed at the output shaft 170 is a direct ratio of the input speed at the input member 104, for example by activating both the first and second clutches C1 130 and C2 140. Region 200 describes operation in M1 state, wherein the speed of the output shaft 170 can be controlled relative to the speed of the input member 104, for example, by the operation of the first and second torque machines 106, 108. The mechanical advantage of operating in the M1 state includes lower gear ratios, with lower output speeds and higher output torques for a given input, as compared to the M2 state, described below. The locking of clutch C1 130 and the unlocking of clutch C2 140 in the M1 state define the mechanical operation of planetary gear sets 150 and 160 with respect to torque input from the engine 102 and the first and second torque machines 106, 108. Similarly, region 210 describes operation in the M2 state, wherein the speed of the output shaft 170 can be controlled relative to the speed of the input member 104, for example, by the operation of the first and second torque machines 106, 108. The mechanical advantage of operating in the M2 state includes higher gear ratios, with higher output speeds and lower output torques for a given input, as compared to the M1 state. The locking of clutch C2 140 and the unlocking of clutch C1 130 in M2 state define the mechanical operation of planetary gear sets 150 and 160 with respect to torque input from the engine 102 and the first and second torque machines 106, 108. Engagement or disengagement of clutches C1 130 and C2 140 determine the state of operation of the powertrain system 100.

Operation in the M1, M2 and fixed gear states are described with reference to FIG. 2 and Table 1. State M1 can be operated in a forward (Fwd) configuration or state, with the driveline operating in a forward direction, and a reverse (Rev) configuration or state, with the driveline operation in a reverse direction. Further, either the M1 or M2 states can operate in a regeneration state (ReGen). The term "F/Lock" indicates the respective clutch, C1 130 or C2 140, is operating in a forward one-way state, i.e., is engaging in the forward direction and free free-wheeling in the reverse direction, or operating in a locked state, i.e., is engaging in both the forward and reverse directions. The term "R/Lock" indicates clutch C1 130 is operating in a reverse one-way state, i.e., is engaging in the reverse direction and free free-wheeling in the forward direction, or is operating in the locked state, i.e., engaging in both the forward and reverse directions. The term "F(FW)/Neutral" indicates clutch C1 130 is operating in a reverse one-way state, i.e. engaging in the reverse direction and free free-wheeling in the forward direction or operating in a disengaged state, i.e., is free-wheeling in both the forward and reverse directions). The term "Lock" indicates clutch C2 140 is operating in a locked state, i.e., is engaged in both the forward and reverse directions. The term "R(FW)/Neutral" indicates clutch C2 140 is operating in a forward one-way state, i.e., is engaging in the forward direction and free free-wheeling in the reverse direction, or operating in a disengaged state, i.e., is free-wheeling in both the forward and reverse directions. The illustrated states of clutches C1 130 and C2 140 can be used to accomplish the depicted exemplary transmission gear settings. It will be appreciated that the list of transmission setting selections described is not exhaustive, and depends upon the particular configuration of the transmission or powertrain, such that different transmission setting selections are possible within the scope of this disclosure.

Figure 3:
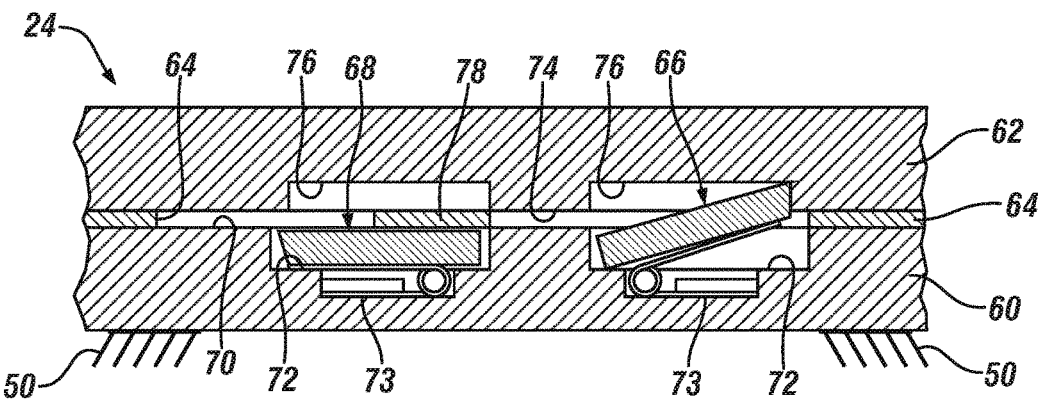
Figure 4:
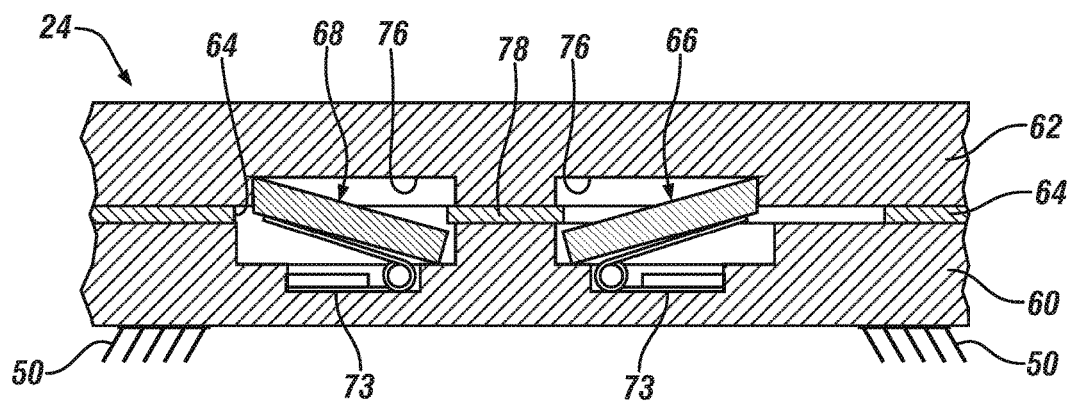

FIGS. 3 and 4 schematically show two cross-sectional views of an exemplary synchronous engagement clutch 24 that is configured as a low-friction or non-friction clutch. FIG. 3 illustrates operation of the clutch 24 in a one-way state (locked in one direction and free-wheeling in the other) and FIG. 4 illustrates operation of the clutch 24 in a locked state (locked in both directions). Exemplary SOWC 24 is an exemplary embodiment of either of clutch C1 130 or C2 140 that is depicted in FIG. 1. In the embodiment as shown, the clutch 24 is a strut-type selectable one-way clutch having a plurality of forward and reverse struts that are locking mechanisms used to provide a mechanical connection between rotating members. However, those skilled in the art will appreciate that other types of synchronous engagement clutches such as selectable one-way clutches that employ other types of locking mechanisms may be used as well. The clutch 24 is configured as a selectable one-way clutch that includes an input disc or member 60, an opposed output disc or member 62, a selection disc or member 64, a selection disc actuator, a forward locking mechanism 66 and a reverse locking mechanism 68. The locking mechanisms may be rollers, sprags, sprockets, struts or other suitable devices. The clutch 24 is selectively controlled to connect a shaft or interconnecting member with a stationary element or ground, for example, with a transmission housing 50. The input member 60 is fixed to a stationary member or transmission housing 50. The output member 62 is rotationally connected to the second shaft or another interconnecting member. The selection disc 64 is disposed between the input and output members 60, 62 and remains stationary relative to the input disc 60 except when activated by the selection disc actuator 78. The input member 60 has a surface 70 that includes a plurality of recesses 72. One of the forward and reverse locking mechanisms 66, 68 is mounted in each recess. The output member 62 has a surface 74 facing the first surface 70 of the input member 60 and includes recesses 76 for receiving and engaging the locking mechanisms 66, 68. A respective biasing member such as a spring 73 urges each locking mechanisms 66, 68 out of the corresponding recess 72 and into the locked position. The selection disc 64 includes an actuation feature 78 that when activated as in FIG. 3 and rotated over the reverse locking mechanism 68 prevents the reverse locking mechanism 68 from engaging with one of the recesses 76 of the output member 62. Such a configuration establishes a reverse one-way state permitting free-wheeling in the forward direction while locking in the reverse direction. When actuation feature 78 is activated as in FIG. 4 and rotates over the reverse locking mechanism 68, both locking mechanisms 66, 68 are in the locked position engaging with a respective one of the recesses 76 of the output member 62. Such a configuration establishes a locked state locking rotation in both directions.

Clutch 24 can include up to four states of operation. For example, the clutch 24 may also include free-wheeling in both directions. In such a state, both the locking mechanisms 66 and 68 are depressed into their respective recesses 72 located in the input member 60. The clutch 24 may also include a forward one-way state permitting free-wheeling in the reverse direction while locking in the forward direction. Clutch 24 is capable of being activated when a rotational speed of the input member 60 is synchronized with a rotational speed of the output member 62.

The terms controller, control module, module, control, control unit, processor and similar terms refer to one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired point-to-point link, a networked communication bus link, a wireless link or another suitable communication link, and is indicated by line 111. Communication includes exchanging data signals in a suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers. The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium. The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

The terms "calibration", "calibrate", and related terms refer to a result or a process that compares an actual or standard measurement associated with a device with a perceived or observed measurement or a commanded position. A calibration as described herein can be reduced to a storable parametric table, a plurality of executable equations or another suitable form. A parameter is defined as a measurable quantity that represents a physical property of a device or other element that is discernible using one or more sensors and/or a physical model. A parameter can have a discrete value, e.g., either "1" or "0", or can be infinitely variable in value.

Figure 5:
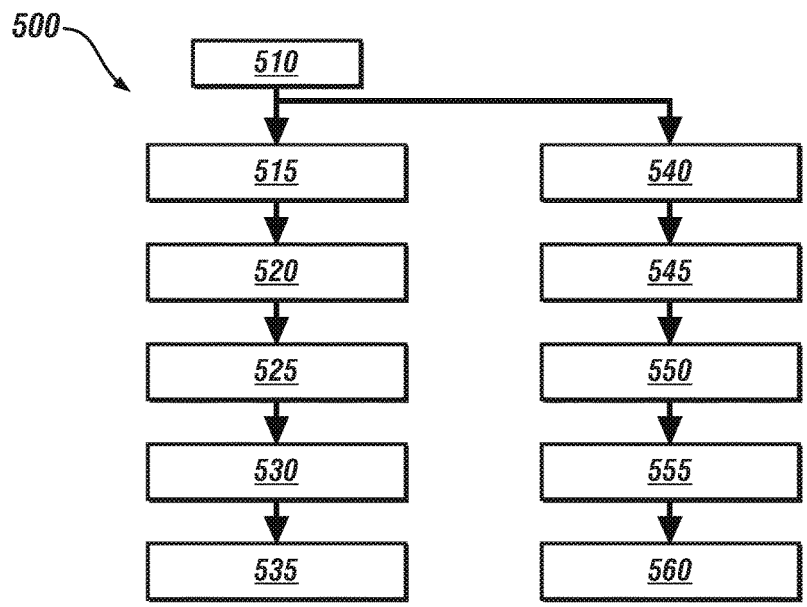
FIG. 5 schematically shows a synchronous clutch engagement routine that may be employed to control operation of an embodiment of the powertrain system to activate or deactivate of one of the synchronous engagement clutches, in accordance with the disclosure.

FIG. 5 schematically shows a synchronous clutch engagement routine 500 that may be employed to control operation of an embodiment of the powertrain system 100 that is described herein, to achieve activation or deactivation of one of the synchronous engagement clutches, e.g., one of clutch C1 130 or clutch C2 140. Table 2 is provided as a key wherein the numerically labeled blocks and the corresponding functions are set forth as follows, corresponding to the synchronous clutch engagement routine 500. The teachings may be described herein in terms of functional and/or logical block components and/or various processing steps. Such block components may be composed of hardware, software, and/or firmware components that configured to perform the specified functions.

TABLE 2

| BLOCK | BLOCK CONTENTS |
| --- | --- |
| 510 | Initiate Transmission Shift - select clutch activation/deactivation |
| 515 | Command clutch activation |
| 520 | Control Ta, Tb, Te in response and Monitor speeds |
| 525 | Determine magnitude of clutch slip |
| 530 | Execute zero-slip feedback control |
| 535 | Activate oncoming clutch when clutch slip is less than threshold |
| 540 | Command clutch deactivation |
| 545 | Control Ta, Tb, Te in response |
| 550 | Determine magnitude of torque across off-going clutch |
| 555 | Execute zero-torque feedback control |
| 560 | Deactivate off-going clutch when torque across off-going clutch is less than threshold |

Execution of the synchronous clutch engagement routine 500 may proceed as follows. The steps of the synchronous clutch engagement routine 500 may be executed in a suitable order, and are not limited to the order described with reference to FIG. 5.

During powertrain operation, there can be a command to initiate a shift in a transmission state that includes activating or deactivating one of the synchronous engagement clutches, e.g., one of clutch C1 130 or clutch C2 140 (510).

When the command is to activate one of clutch C1 130 or clutch C2 140 (515), the control routine executes to control motor torques (Ta, Tb) of the first and second non-combustion torque machines 106, 108, respectively, and engine torque (Te) in a manner that is responsive to the operator request for output torque coincident with controlling speeds of the members of the oncoming clutch to synchronize their speeds (520). Torque control of the first and second torque machines 106, 108, respectively, can be achieved by controlling electric current through the power inverters. Torque control of the engine 102 can be achieved by controlling fuel flow thereto. Rotational speeds are monitored by monitoring inputs from the speed sensors 105, 107, 109 and 161, from which speeds of opposed first and second members of the activating synchronous clutch, i.e., clutch C1 130 or clutch C2 140, can be determined based upon gear ratios. A clutch slip speed for the oncoming clutch can be determined based thereon, and is an arithmetic difference between speeds of opposed first and second members of the activating synchronous clutch (525). When the clutch slip speed is less than a first threshold, a zero-slip feedback control routine is executed (530). The zero-slip feedback control routine is a feedback control routine that has the clutch slip as a feedback term, and the first and second torque machines 106, 108 as the controlled actuators, wherein the torque outputs thereof are controlled to ramp down the clutch slip to achieve a clutch slip speed between the opposed first and second members of the activating synchronous clutch that is zero. When the ramped-down clutch slip speed is less than a threshold clutch slip speed that is at or approaching zero, the oncoming clutch is activated (535), and the zero-slip feedback control routine is discontinued. The first and second non-combustion torque machines 106, 108, respectively, and engine torque (Te) are again controlled in a manner that is responsive to the operator request for output torque.

When the command is to deactivate one of clutch C1 130 or clutch C2 140 (540), the control routine executes to control motor torques (Ta, Tb) of the first and second non-combustion torque machines 106, 108, respectively, and engine torque (Te) in a manner that is responsive to the operator request for output torque coincident with controlling torque transfer across the members of the oncoming clutch (545). This includes ramping down the torque across the off-going clutch while maintaining a zero-slip clutch condition. The torque across the off-going clutch is monitored (550) and when the torque across the off-going clutch is less than a first threshold, a zero-torque feedback control routine is executed (555). The zero-torque feedback control routine is a feedback control routine that has torque transfer across the opposed first and second members of the deactivating synchronous clutch, i.e., clutch torque as a feedback term, and the first and second torque machines 106, 108 as the controlled actuators. The torque outputs of the first and second torque machines 106, 108 are controlled to ramp down clutch torque to achieve and maintain clutch torque that is zero, preferably while maintaining speed across the members of the clutch at zero. When the clutch torque is maintained at a zero torque level, the off-going clutch is deactivated (560), and the zero torque feedback control routine is discontinued. The first and second non-combustion torque machines 106, 108, respectively, and engine torque (Te) are again controlled in a manner that is responsive to the operator request for output torque.

The synchronous clutch engagement routine 500 can be executed as one or a plurality of algorithms in the controller 110 to effect clutch control sequencing that includes synchronizing the speeds of the opposed members of the oncoming clutch while maintaining the output torque in a manner that does not negatively affect operator perceptions. As such, this operation facilitates use of low-friction or non-friction clutches such as SOWCs in a multi-mode powertrain system.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by single-purpose hardware-based systems that perform the specified functions or acts, or combinations of single-purpose hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method for operating a powertrain system including a geartrain configured to operate in a transmission state to transfer mechanical power between an internal combustion engine, first and second torque machines and a driveline by activation of a synchronous engagement clutch, wherein the synchronous engagement clutch is composed of opposed first and second members that are disposed to rotate in concert when the synchronous engagement clutch is activated and wherein the opposed first and second members are disposed to rotate independently from each other when the synchronous engagement clutch is deactivated, the method comprising:
 commanding activation of the synchronous engagement clutch;
 commanding operations of the engine and the first and second torque machines to control rotational speeds of the opposed first and second members of the synchronous engagement clutch, including monitoring the rotational speeds of the opposed first and second members;
 determining a magnitude of clutch slip based upon the rotational speeds of the opposed first and second members;
 executing a zero-slip feedback control routine when the clutch slip approaches a zero-slip state; and
 activating the synchronous engagement clutch when the clutch slip is less than a threshold level associated with the zero-slip state.

2. The method of claim 1, wherein the geartrain is configured to operate in one of a plurality of transmission states, and wherein the activation of the synchronous engagement clutch is associated with operation of the geartrain in one of the transmission states.

3. The method of claim 1, wherein commanding operations of the engine and the first and second torque machines to control rotational speeds of the opposed first and second members of the synchronous engagement clutch comprises controlling torque outputs of the engine and the first and second torque machines responsive to an operator request for output torque.

4. The method of claim 1, wherein the zero-slip feedback control routine is operative to control the first and second torque machines to control the rotational speeds of the opposed first and second members to achieve the zero-slip state.

5. The method of claim 1, further comprising commanding deactivation of the synchronous engagement clutch, including:
 commanding operations of the engine and the first and second torque machines to control torque outputs, and monitoring the rotational speeds of the opposed first and second members;
 determining a magnitude of clutch torque across the synchronous engagement clutch based upon the torque outputs;
 executing a zero-torque feedback control routine when the clutch torque approaches a zero-torque state, wherein the zero-torque feedback control routine is operative to control torque output from the first and second torque machines to maintain zero torque transfer across the synchronous engagement clutch; and
 deactivating the synchronous engagement clutch when the clutch torque across the synchronous engagement clutch is zero.

6. The method of claim 5, wherein the zero-torque feedback control routine is operative to control torque output from the internal combustion engine and the first and second torque machines to maintain zero torque transfer across the synchronous engagement clutch.

7. A method for operating a powertrain system including a geartrain configured to operate in one of a plurality of transmission states to transfer mechanical power between an internal combustion engine, first and second torque machines and a driveline by selective activation of first and second synchronous engagement clutches, wherein each of the synchronous engagement clutches includes opposed first and second members that are disposed to rotate in concert when a respective one of the first and second synchronous engagement clutches is activated, the method comprising:

commanding activation of one of the synchronous engagement clutches associated with one of the transmission states;

commanding operations of the engine and the first and second torque machines to control rotational speeds of the opposed first and second members of the one of the synchronous engagement clutches, including monitoring the rotational speeds of the opposed first and second members;

determining a magnitude of clutch slip based upon the rotational speeds of the opposed first and second members;

executing a zero-slip feedback control routine when the clutch slip approaches a zero-slip state; and activating the one of the synchronous engagement clutches when the clutch slip is less than a threshold level associated with the zero-slip state.

8. The method of claim 7, wherein commanding operations of the engine and the first and second torque machines to control rotational speeds of the opposed first and second members of the one of the synchronous engagement clutches further comprises controlling torque outputs of the engine and the first and second torque machines responsive to an operator request for output torque.

9. The method of claim 7, wherein the zero-slip feedback control routine is operative to control the first and second torque machines to control the rotational speeds of the opposed first and second members to achieve the zero-slip state.

10. The method of claim 7, further comprising commanding deactivation of the one of the synchronous engagement clutches, including:

commanding operations of the engine and the first and second torque machines to control torque outputs, and monitoring the rotational speeds of the opposed first and second members associated with the synchronous engagement clutch;

determining a magnitude of clutch torque based upon the torque outputs;

executing a zero-torque feedback control routine when the clutch torque approaches a zero-torque condition; and deactivating the synchronous engagement clutch when the clutch torque is less than a threshold level associated with the zero clutch torque.

11. The method of claim 10, wherein the zero-torque feedback control routine is operative to maintain torque output from the first and second torque machines and the internal combustion engine to achieve zero torque transfer across the synchronous engagement clutch.

12. A powertrain system disposed to transfer tractive power to a driveline, comprising:

an internal combustion engine;

first and second torque machines;

a geartrain including a synchronous engagement clutch, wherein the geartrain is configured to operate in one of a plurality of transmission states to transfer mechanical power between the internal combustion engine, the first and second torque machines and the driveline by selective activation of the synchronous engagement clutch, wherein the synchronous engagement clutch includes opposed first and second members that are disposed to rotate in concert when the synchronous engagement clutch is activated, and wherein the synchronous engagement clutch is defined as a clutch wherein the speeds of the opposed first and second members are required to be synchronized to effect activation thereof;

a controller, operatively connected to the internal combustion engine, the first and second torque machines and the synchronous engagement clutch, the controller including a processor and memory including an instruction set, the instruction set executable to:

command activation of the synchronous engagement clutch;

command operations of the engine and the first and second torque machines to control rotational speeds of the opposed first and second members of the synchronous engagement clutch;

monitor the rotational speeds of the opposed first and second members of the synchronous engagement clutch;

determine a magnitude of clutch slip for the synchronous engagement clutch based upon the rotational speeds of the opposed first and second members;

execute a zero-slip feedback control routine when the clutch slip approaches a zero-slip state; and activate the synchronous engagement clutch when the clutch slip is less than a threshold level associated with zero clutch slip.

13. The powertrain of claim 12, further comprising the instruction set executable to command operations of the engine and the first and second torque machines to control rotational speeds of the opposed first and second members of the synchronous engagement clutch responsive to an operator request for output torque.

14. The powertrain of claim 12, further comprising the instruction set executable to command deactivation of one of the synchronous engagement clutch, including:

command operations of the engine and the first and second torque machines to control torque outputs, and monitoring the rotational speeds of the opposed first and second members associated with the synchronous engagement clutch;

determine a magnitude of clutch torque based upon the torque outputs;

execute a zero-torque feedback control routine when the clutch torque approaches a zero-torque condition, wherein the zero-torque feedback control routine is operative to maintain torque output from the first and second torque machines to achieve zero torque; and deactivate the synchronous engagement clutch when the clutch torque is less than a threshold level associated with the zero clutch torque.

15. The powertrain of claim 12, wherein the instruction set is executable to control the rotational speeds of the first and second members of the opposed first and second members of the synchronous engagement clutch to achieve zero clutch slip.

* * * * *